(12) United States Patent
Huang et al.

(10) Patent No.: US 9,366,327 B2
(45) Date of Patent: Jun. 14, 2016

(54) SERIALLY-CONNECTED BALL SCREW PAIR AND PIEZOELECTRIC ACTUATOR MACRO-MICRO DRIVING AND GUIDING DEVICE

(75) Inventors: Yumei Huang, Xi'an Shaanxi (CN); Hongyan Liu, Xi'an Shaanxi (CN); Xingang Yang, Xi'an Shaanxi (CN); Yong Yang, Xi'an Shaanxi (CN)

(73) Assignee: XI'AN UNIVERSITY OF TECHNOLOGY, Xi'an Shaanxi (CN)

( * ) Notice: Subject to any disclaimer, the term of this patent is extended or adjusted under 35 U.S.C. 154(b) by 228 days.

(21) Appl. No.: 14/001,896

(22) PCT Filed: Oct. 26, 2011

(86) PCT No.: PCT/CN2011/081354
§ 371 (c)(1),
(2), (4) Date: Sep. 18, 2013

(87) PCT Pub. No.: WO2012/116549
PCT Pub. Date: Sep. 7, 2012

(65) Prior Publication Data
US 2015/0040703 A1    Feb. 12, 2015

(30) Foreign Application Priority Data
Feb. 28, 2011  (CN) .......................... 2011 1 0047305

(51) Int. Cl.
*F16H 25/22*   (2006.01)
*B23Q 1/30*    (2006.01)
*B23Q 5/40*    (2006.01)

(52) U.S. Cl.
CPC .............. *F16H 25/2204* (2013.01); *B23Q 1/30* (2013.01); *B23Q 5/40* (2013.01); *Y10T 74/18656* (2015.01)

(58) Field of Classification Search
CPC . F16H 25/2204; F16H 25/2209; F16H 25/20; F16H 25/2003; B23Q 5/40; B23Q 5/408
USPC .............. 74/89.33, 490.08, 490.09, 74/490.11–490.13; 73/105; 33/706–708, 33/1 M, 813, 814, 821, 822
See application file for complete search history.

(56) References Cited

U.S. PATENT DOCUMENTS 4,805,543 A * 2/1989 Schwab et al. .................. 108/20
6,000,292 A * 12/1999 Nagai et al. .................. 74/89.33
(Continued)

FOREIGN PATENT DOCUMENTS

CN   101941080 A   1/2011
CN   102152131 A   8/2011
(Continued)

*Primary Examiner* — William Kelleher
*Assistant Examiner* — Gregory Prather
(74) *Attorney, Agent, or Firm* — Blank Rome LLP

(57) ABSTRACT

A serially-connected ball screw pair and piezoelectric actuator macro-micro driving and guiding device includes, from the bottom to the top, a sliding seat (1), a ball screw pair, a sliding table guide rail pairs, a nut seat (6), a piezoelectric actuator (7), a micro-moving table, a nut seat guide rail pairs and a sliding table (1). The axis of a ball screw is symmetric with respect to two sliding table rail pairs, a nut (3) of the ball screw pair is fixedly mounted into the nut seat (6), one end of the piezoelectric actuator (7) is fixedly connected with the nut seat (6) and the other end thereof is fixedly connected with the micro-moving table (8), the axis of the piezoelectric actuator is symmetric relative to two sliding table rail pairs, an upper surface of the micro-moving table is fixedly mounted to a lower surface of the sliding table, and two nut rail pairs are symmetric relative to the axis of the ball screw. The ultra precision feeding in a long stroke within a full journey can be achieved; and the piezoelectric actuator only endures the driving force without enduring the driving torque generated by the driving force of the ball screw pair, thus, so that the piezoelectric actuator is in a good stressed status, which is applicable to a large-load ultra-precision feed system.

6 Claims, 4 Drawing Sheets

(56) References Cited

U.S. PATENT DOCUMENTS 6,236,201 B1 * 5/2001 Kilicci et al. ................. 324/212
7,665,349 B2 * 2/2010 Mininni et al. ................. 73/105
2004/0177520 A1 * 9/2004 Nakamura et al. ............. 33/1 M

FOREIGN PATENT DOCUMENTS

| GB | 1 497 250 A | 1/1978 |
| JP | 61-214941 A | 9/1986 |
| JP | 2009-270647 A | 11/2009 |

* cited by examiner

SERIALLY-CONNECTED BALL SCREW PAIR AND PIEZOELECTRIC ACTUATOR MACRO-MICRO DRIVING AND GUIDING DEVICE

TECHNICAL FIELD

The present disclosure belongs to a technical field of precision Computerized Numerical Control machine tools, relates to a macro-micro feeding and driving system adapted for a full-load precision and ultra-precision CNC machine tools being driven in a large-scale, full journey macro-micro manner, and more particularly, to a serially-connected ball screw pair and piezoelectric actuator macro-micro driving and guiding device.

DESCRIPTION OF THE RELATED ART

With the development of science and technology, since there are increasing demands for processing high precision parts, and the ultra precision processing has entered into a nano-scale, the precision and ultra-precision CNC machine tool in a micron-scale, a submicron-scale or a nano-scale has become one of the important development tendencies of advanced CNC machine tools. The feeding system of a machine tool is one of key factors affecting the overall performance of the machine tool. The driving, transmission and guiding devices have great influences on the performance of the feeding system. One of effective approaches to improve the feeding precision of the large-scale, full-load ultra-precision processing machine tools is to employ a macro-micro feeding and driving system that combines a macro driving with a micro driving. The macro driving is used for implementing processing size and profile, and the micro driving is used for compensating for errors in size and profile, so as to satisfy the requirements for the ultra-precision processing.

A micro driver of a linear feeding macro-micro driving system mainly employs a piezoelectric actuator or a magnetostrictive actuator, and there are mainly two driving modes for the macro driving part: one is to drive directly by a linear motor, and the other is to drive by a servo motor via a ball screw pair. There are two modes of combining the macro driver with the micro driver: one is to directly connect the macro driver with the micro driver in series, that is, each of feeding shafts is configured to include the macro driver and the micro driver in series, for example, in a macro-micro driving numerically controlled lathe having Z axis and X axis feeding movements, each of Z axis and X axis is configured to include a macro driver and a micro driver in series; and the other mode is to separate the macro driving device from the micro driving device, wherein the macro driving manner is the same as that in a conventional machine tool, while the micro driving device may be designed as a separate component, and be mounted at any other positions, for example, in the macro-micro driving numerically controlled lathe having Z axis and X axis feeding movements, the X axis and Z axis macro drivers may be separately disposed as those in the conventional machine tools, while the X axis and Z axis micro drivers are designed as a X-Z dual-axis micro driving device, and mounted at a tool holder.

In a linear feeding mechanism, such as an X axis feeding mechanism, the external loads may include three forces $F_X$, $F_Z$, $F_Y$ and three moments $M_X$, $M_Y$, $M_Z$ entirely, wherein an X axis driving mechanism withstands the external load $F_X$ in the feeding direction, and a guide rail pair withstands the other external loads $F_Z$, $F_Y$ and $M_X$, $M_Y$, $M_Z$. The above three modes of the macro driver directly connecting with the micro driver in series, including the ball screw pair connecting with the micro driver in series, the linear motor connecting with the micro driver in series and the micro driving device being a separate component, are different from each other in terms of guiding requirements and guiding device. The later two modes do not have the ball screw pair, so that the problem of guiding a nut does not exist, and there is only a driving force without a moment generated by the driving force. Regarding the first mode, although the forces $F_Z$, $F_Y$ and moments $M_X$, $M_Y$, $M_Z$ of the external loads are bore by the guide rail, the external load $F_X$ in the feeding direction is bore by the ball screw pair. Thus, the driving force $F_X$ of the ball screw pair will generate a driving torque $M_X$ corresponding to the force $F_X$, and the driving force $F_X$ of the ball screw pair will also generate a driving moment corresponding to the $F_X$ when the ball screw pair and the micro driver are not in the same axis (in order to be distinguished from the external load moment, the torque and bending moment generated by the driving force are called as driving moment). In the mode of the ball screw pair connecting with the micro driver in series, a nut will be connected with the micro driver in series, while the micro driver cannot bear moment or can only bear a small moment (torque, bending moment). Thus, as for the precision feeding system of a large-scale, full-load ultra-precision CNC machine tool which employs the mode of the ball screw pair connecting with the micro driver in series, the guiding device (guide rail) of the nut is the key.

SUMMARY

The aspect of the present disclosure is to provide a macro-micro driving precision feeding device in which a ball screw pair and a piezoelectric actuator are serially-connected for a full journey macro-micro driving, which has a good guiding performance and a strong bearing capacity, and is applicable to a large-scale, full-journey, and high-load driving.

The technical solution adopted by the present disclosure is a serially-connected ball screw pair and piezoelectric actuator macro-micro driving and guiding device, including: a sliding table and a sliding seat disposed up and down, with one ball screw pair and two sliding table guide rail pairs disposed therebetween, the two sliding table guide rail pairs being located at two sides of the ball screw pair, respectively, the sliding table guide rail pair including a guide rail bar and two sliders embedded in the guide rail bar, the ball screw pair including a ball screw and a nut inserted on the ball screw; a nut seat disposed on the nut; and nut seat guide rail pairs, a micro-moving table and the piezoelectric actuator being disposed on the nut seat, wherein one end of the piezoelectric actuator is fixedly connected with the nut seat, the other end thereof is fixedly connected with the micro-moving table, the upper surfaces of the sliders of the sliding table guide rail pairs and the micro-moving table are fixed on the lower surface of the sliding table, and two guide rail bars of the sliding table guide rail pairs are fixed on the upper surface of the sliding seat.

Wherein, the nut seat includes a nut seat body, side wings and a protrusion disposed on a front portion of the upper surface of the nut seat body; the nut seat body is provided with a hole, and the nut is fixedly mounted into the hole of the nut seat body; the side wings are located at two sides of the nut seat body, respectively; the micro-moving table is disposed on a back portion of the upper surface of the nut seat body; one end of the piezoelectric actuator is fixedly connected with the protrusion, and the other end is fixedly connected with the micro-moving table; and the nut seat guide rail pairs are disposed on the side wings at the two sides of the nut seat body.

Wherein, the nut seat guide rail pair includes sliders and the slide bars disposed on the sliders, wherein two sliders are symmetrically and fixedly mounted on the upper surfaces of the side wings at two sides of the nut seat, and two guide rail bars are fixedly mounted to the lower surface of the sliding table.

The other nut seat guide device is as follows: the nut seat includes a nut seat body, side wings and a protrusion disposed on a front portion of the upper surface of the nut seat body; the side wings are disposed at two sides of the protrusion, respectively; the nut seat body is provided with a hole, and the nut is fixedly mounted into the hole of the nut seat body; the micro-moving table is disposed on a back portion of the upper surface of the nut seat body, one end of the piezoelectric actuator is fixedly connected with the protrusion, and the other end is fixedly connected with the micro-moving table; sliders of the nut seat guide rail pairs are fixed on the lower surfaces of the two side wings, and the sliders as the nut seat guide rail pairs are embedded in the guide rail bars of the sliding table guide rail pairs.

Wherein, the side wings at two sides of the nut seat extend into notches in two sides of the sliding table, respectively, and there is a gap between the side wing and the sliding table.

In addition, the axis of the ball screw coincides with the symmetric line of the two sliding table guide rail pairs; and the axis of the piezoelectric actuator coincides with the symmetric line of the two sliding table guide rail pairs.

The advantageous effect of the present disclosure is that the combination of macro driving and micro driving can implement the ultra precision feeding in a long stroke within a full journey; and the piezoelectric actuator only endures the driving force without enduring the driving torque generated by the driving force of the ball screw pair, so that the piezoelectric actuator is in a good stressed status, which is applicable to a large-load ultra-precision feed system.

Figure 1:
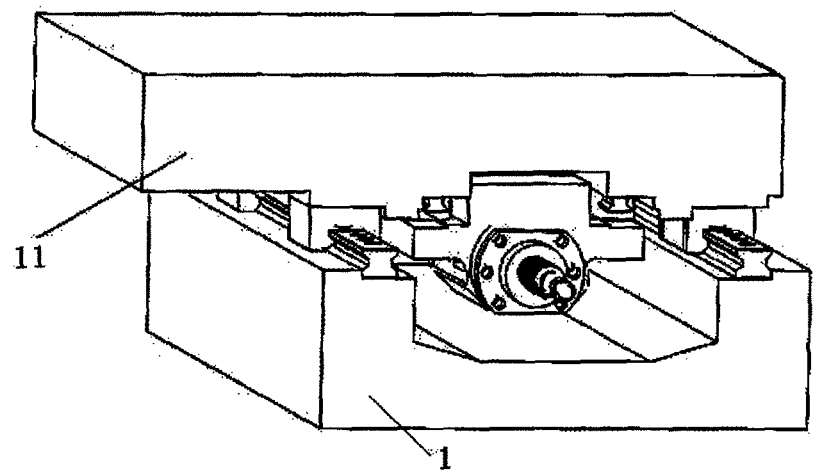
FIG. 1 is a structural appearance view illustrating a precision feeding device according to an embodiment 1 of the present disclosure.

In the drawings, it is represented as: 1. sliding seat; 2. ball screw; 3. nut; 4. guide rail bar; 5. slider; 6. nut seat; 7. piezoelectric actuator; 8. micro-moving table; 9. a slider; 10. guide rail bar; 11. sliding table; 12. slider; 6-1. side wing of nut seat; 6-2. nut seat protrusion; and 6-3. nut seat body.

DETAILED DESCRIPTION OF DETAILED EMBODIMENTS

Hereinafter the present disclosure will be described in detail by referring to the detailed embodiments and accompanying drawings.

Embodiment 1

Figure 2:
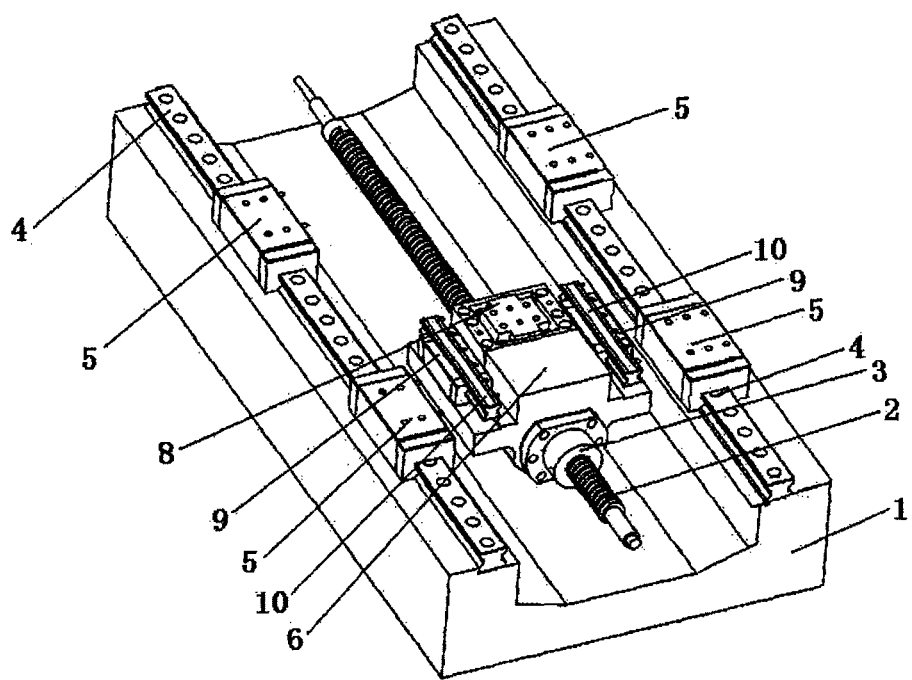
FIG. 2 is a structural configuration view illustrating the precision feeding device without a sliding table in the embodiment 1 of the present disclosure.
Figure 3:
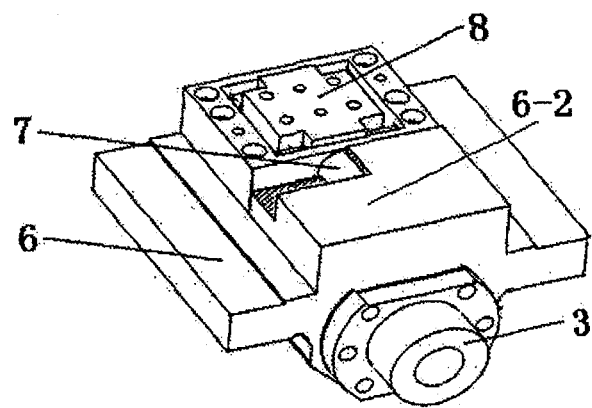
FIG. 3 is a view illustrating a serial connection of a nut, a nut seat, a piezoelectric actuator and a micro-moving table in the embodiment 1 of the present disclosure.
Figure 4:
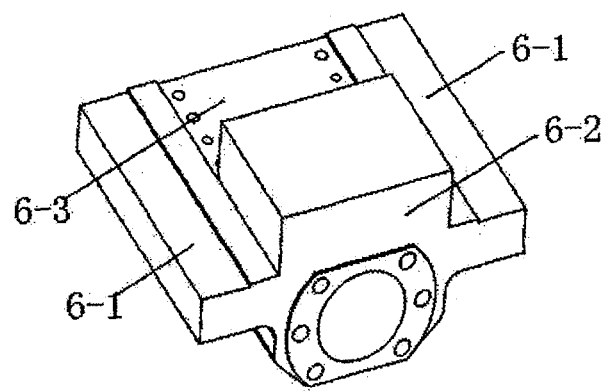
FIG. 4 is a structural schematic view of the nut seat in the embodiment 1 of the present disclosure.

The present disclosure provides a serially-connected ball screw pair and piezoelectric actuator macro-micro driving and guiding device, as illustrated in FIG. 1, including a sliding table and a sliding seat disposed up and down, with one ball screw pair and two sliding table guide rail pairs disposed therebetween. As illustrated in FIG. 2, the two sliding table guide rail pairs are located at both sides of the ball screw pair, respectively; each guide rail pair of the sliding table includes one guide rail bar 4 and two sliders 5 embedded into the guide bar 4; the ball screw pair includes a ball screw 2 and a nut 3 inserted on the ball screw 2; two guide rail bars 4 of the two sliding table guide rail pairs are fixed on the upper surfaces of both sides of the sliding seat 1, and 4 sliders 5 are fixed on the lower surface of the sliding table 11; two ends of the ball screw 2 are connected with the sliding seat 1 through screw bearings (which is the same as the conventional ball screw bearing, not illustrated in the drawings) fixedly mounted at two ends of the sliding seat 1, and the axis of the ball screw coincides with the symmetric line of the two sliding table guide rail pairs. The serially-connected ball screw pair and piezoelectric actuator macro-micro driving and guiding device according to the present disclosure further includes a nut seat 6, which includes a nut seat body 6-3, side wings 6-1 and a protrusion 6-2 disposed on a front portion of the upper surface of the nut seat body 6-3, as illustrated in FIG. 4; the nut seat body 6-3 is provided with a hole, into which the nut 3 is fixedly mounted; and the side wings 6-1 are disposed at both sides of the nut seat body 6-3, respectively. As illustrated in FIG. 3, a micro-moving table 8 is disposed on a back portion of the upper surface of the nut seat body 6-3; the nut seat 6 is also disposed with a piezoelectric actuator 7, wherein one end of the piezoelectric actuator 7 is fixedly connected with the protrusion 6-2, and the other end of the piezoelectric actuator 7 is fixedly connected with the micro-moving table 8; the upper surface of the micro-moving table 8 is fixedly mounted to the lower surface of the sliding table 11; and an axis of the piezoelectric actuator 7 coincides with the symmetric line of the two sliding table guide rail pairs. Each of side wings 6-1 at two sides of the nut seat body 6-3 is provided with one nut seat guide rail pair, which includes sliders 9 and guide rail bars 10 disposed on the slider 9; and two sliders 9 of the two nut seat guide rail pairs are symmetrically and fixedly mounted on the upper surfaces of the side wings 6-1 on the two sides of the nut seat 6, while the two guide rail bars 10 of the two nut seat guide rail pairs are fixedly mounted to the lower surface of the sliding table 11.

Embodiment 2

As for a small serially-connected ball screw pair and micro driver feeding system, the interval between the sliding table 11 and the two sliding table guide rail pairs is constrained, which does not allow to independently dispose a nut seat guide rail pair on the nut seat 6. The present disclosure provides another serially-connected ball screw pair and micro driver macro-micro driving and guiding device, wherein the nut seat guide rail pairs are disposed separately, the nut seat guide rail pair and the sliding table guide rail pair share the guide rail bar, a slider 12 of the nut seat guide rail pair is configured to be on the guide rail bar 4 of the sliding table guide rail pair, the side wings 6-1 at two sides of the nut seat 6 extend into notches in two sides of the sliding table 11, respectively, without contacting with the sliding table 11, and the slider 12 of the nut guide rail pair is fixedly mounted to the lower surface of the side wings 6-1 at two sides of the nut seat 6.

Figure 5:
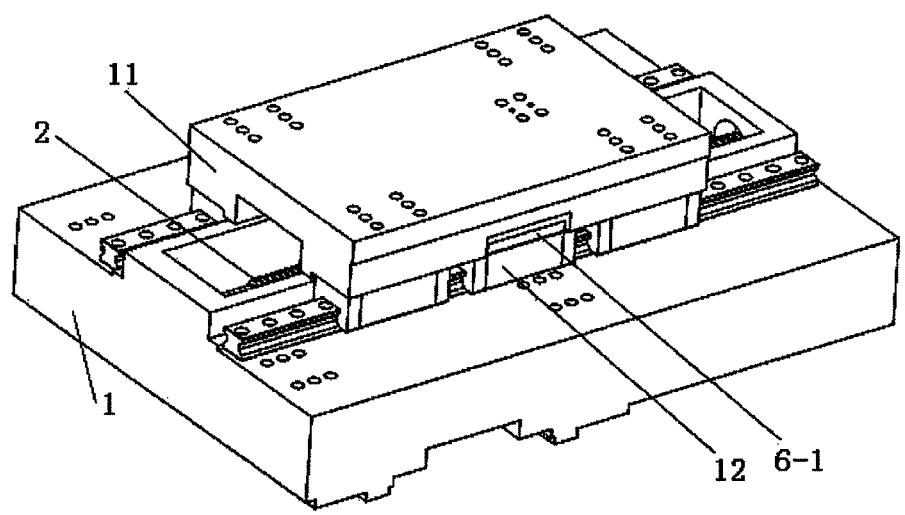
FIG. 5 is a structural appearance view illustrating a structure of a precision feeding device according to an embodiment 2 of the present disclosure.
Figure 6:
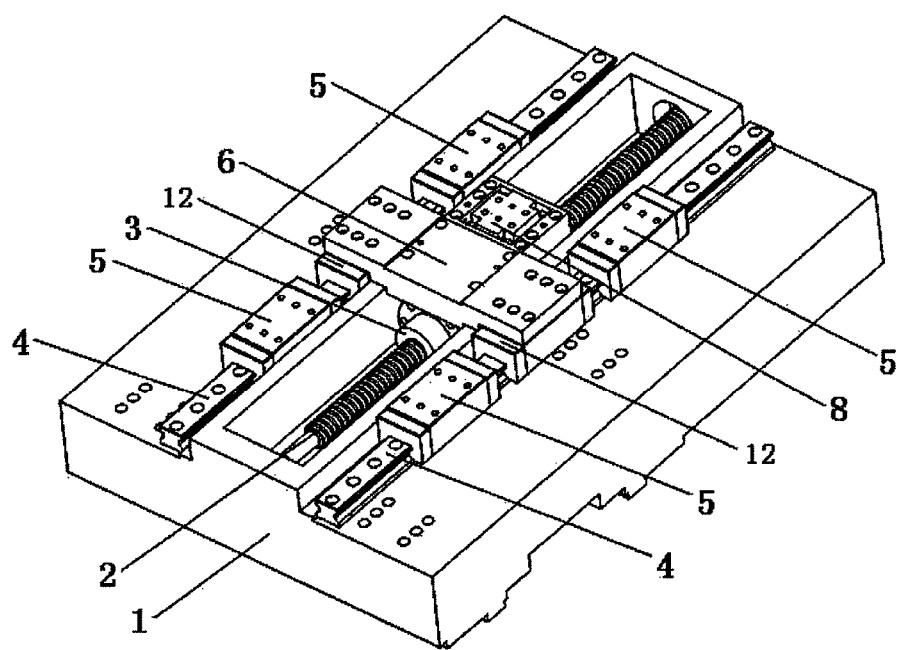
FIG. 6 is a structural configuration view illustrating the precision feed device without a sliding table in the embodiment 2 of the present disclosure.
Figure 7:
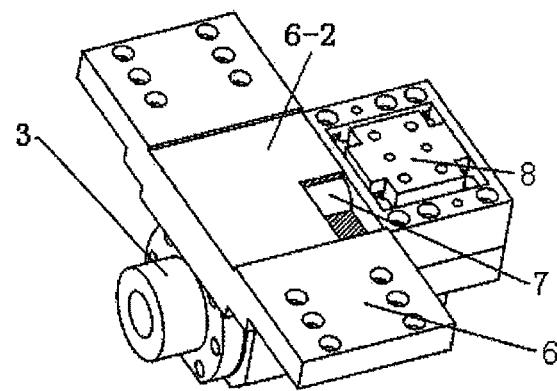
FIG. 7 is a view illustrating a serial connection of a nut, a nut seat, a piezoelectric actuator and a micro-moving table according to the embodiment 2 of the present disclosure.
Figure 8:
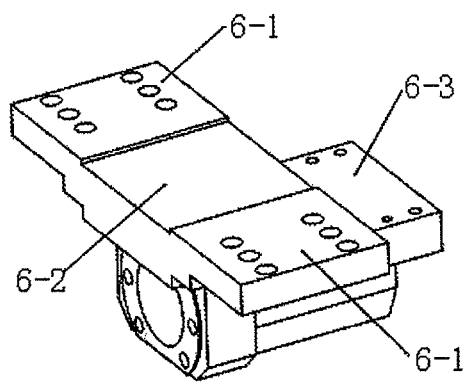
FIG. 8 is a structural schematic view of the nut seat in the embodiment 2 of the present disclosure.

The specific structure of the device, as illustrated in FIG. 5, includes a sliding table 11 and a sliding seat 1 disposed up and down, with one ball screw pair and two sliding table guide rail pairs disposed therebetween. As illustrated in FIG. 6, the two sliding table guide rail pairs are located at both sides of the ball screw pair, respectively; each sliding table guide rail pair includes one guide rail bar 4 and two sliders 5 embedded into the guide bar 4; the ball screw pair includes a ball screw 2 and a nut 3 inserted on the ball screw 2; two guide rail bars 4 of the two sliding table guide rail pairs are fixed on the upper surfaces of the two sides of the sliding seat 1, while four sliders 5 are fixed to the lower surface of the sliding table 11, respectively; two ends of the ball screws 2 are connected with the sliding seat 1 by screw bearings (which is the same as the conventional ball screw bearing, not illustrated in the drawings) fixedly mounted at two ends of the sliding seat 1; and the axis of the ball screw 2 coincides with the symmetric line of the two sliding table guide rail pairs. The serially-connected ball screw pair and piezoelectric actuator macro-micro driving and guiding device according to the present disclosure further includes a nut seat 6, as illustrated in FIG. 8, which has a nut seat body 6-3, side wings 6-1 and a protrusion 6-2 disposed on a front portion of the upper surface of the nut seat body 6-3, wherein the side wings 6-1 are located at two sides of the protrusion 6-2 and extend into notches in two sides of the sliding table 11 without contacting the sliding table 11. As illustrated in FIG. 7, the nut seat body 6-3 is provided with a hole, into which the nut 3 is fixedly mounted; a micro-moving table 8 is disposed on a back portion of the upper surface of the nut seat body 6-3; the piezoelectric actuator 7 is disposed on the nut seat 6, wherein one end of the piezoelectric actuator 7 is fixedly connected with the protrusion 6-2, and the other end of the piezoelectric actuator 7 is fixedly connected with the micro-moving table 8; the upper surface of the micro-moving table 8 is fixedly mounted to the lower surface of the sliding table 11; the axis of the piezoelectric actuator 7 coincides with the symmetric line of the two sliding table guide rail pairs. Each of the guide rail bars 4 is embedded with a slider 12, two sliders 12 are fixedly mounted to the lower surfaces of the side wings 6-1 of the nut seat 6, respectively, one guide rail bar 4 and one slider 12 configured to be thereon constitute a nut seat guide rail pair, and the nut seat 6 totally has two nut seat guide rail pairs.

The principle of the serially-connected ball screw pair and micro driver macro-micro driving and guiding device according to the present disclosure is that: the micro driver adopts the piezoelectric actuator 7; the ball screw pair is directly connected to the piezoelectric actuator 7 in series; the long-stroke macro feeding in meter (m) scale is implemented by the ball screw pair; while the serially-connected piezoelectric actuator 7 implements the ultra-precision feeding in $10^{-9}$ m (nano) scale based on the macro feeding; the macro driving and the micro driving can be performed simultaneously; the combination of macro and micro driving can implement the ultra-precision feeding in a long stroke within a full journey; moreover, since the ball screw pair is directly connected with the piezoelectric actuator 7 in series, the structure is compact in the height direction; in the external loads applied to the sliding table 11, other external loads (the lateral forces in two directions perpendicular to the feeding direction and three moments) except for the feeding force (the force in the feed direction) are endured by the sliding table guide rail pairs, and transferred to the sliding seat 1 via the sliding table guide rail pairs; the feeding force is transferred to the sliding seat 1 via the serially-connected piezoelectric actuator 7 and the ball screw pair; the driving moment against the feeding force and generated by the driving force of the ball screw pair, is transferred to the sliding table 11 via the nut guide rail pairs, and then transferred to the sliding seat via the sliding table 11 and the sliding table guide rail pairs (in the serially-connected ball screw pair and piezoelectric actuator macro-micro driving and guiding device according to the Embodiment 1), or is directly transferred to the sliding seat 1 via the nut guide rail pairs (in the serially-connected ball screw pair and piezoelectric actuator macro-micro driving and guiding device according to the Embodiment 2); thus, the piezoelectric actuators of such two devices only endure the driving force without enduring the driving moment generated by the driving force of the ball screw pair, then the stress status of the piezoelectric actuator 7 is good, which is applicable to a large-load ultra-precision feeding system.

What is claimed is:

1. A serially-connected ball screw pair and piezoelectric actuator macro-micro driving and guiding device, comprising:

a sliding table (11) and a sliding seat (1) disposed up and down, with one ball screw pair and two sliding table guide rail pairs disposed therebetween, the two sliding table guide rail pairs being located at two sides of the ball screw pair, respectively, and wherein each one of the sliding table guide rail pairs includes a guide rail bar (4), fixed on the upper surface of the sliding seat (1), and two sliders (5) embedded in the guide rail bar, and wherein the ball screw pair includes a ball screw (2) and a nut (3) inserted on the ball screw (2);

a nut seat (6) disposed on the nut (3); and nut seat guide rail pairs, a micro-moving table (8) and a piezoelectric actuator (7) disposed on the nut seat (6), wherein one end of the piezoelectric actuator (7) is fixedly connected with the nut seat (6), the other end thereof is fixedly connected with the micro-moving table (8), the upper surfaces of the slider (5) and the micro-moving table (8) are fixed on the lower surface of the sliding table (11); and wherein the nut seat (6) comprises a nut seat body (6-3), side wings (6-1) and a protrusion (6-2) disposed on a front portion of the upper surface of the nut seat body (6-3); the nut seat body (6-3) is provided with a hole, and the nut (3) is fixedly mounted into the hole of the nut seat body (6-3); the side wings (6-1) are located at two sides of the nut seat body (6-3), respectively; the micro-moving table (8) is disposed on a back portion of the upper surface of the nut seat body (6-3), one end of the piezoelectric actuator (7) is fixedly connected with the protrusion (6-2), and the other end of the piezoelectric actuator (7) is fixedly connected with the micro-moving table (8); and the nut seat guide rail pairs are provided at the side wings (6-1) at the two sides of the nut seat body (6-3).

2. The device of claim 1, being characterized in that, the nut seat guide rail pair comprises sliders (9) and guide rail bars (10) disposed on the sliders, wherein two sliders (9) are symmetrically and fixedly mounted on the upper surfaces of the side wings at two sides of the nut seat (6), and two guide rail bars (10) are fixedly mounted to the lower surface of the sliding table (11).

3. The device of claim 2, being characterized in that, an axis of the ball screw (2) coincides with a symmetric line of the two sliding table guide rail pairs; and an axis of the piezoelectric actuator (7) coincides with the symmetric line of the two sliding table guide rail pairs.

4. A serially-connected ball screw pair and piezoelectric actuator macro-micro driving and guiding device, comprising:

a sliding table (11) and a sliding seat (1) disposed up and down, with one ball screw pair and two sliding table guide rail pairs disposed therebetween, the two sliding table guide rail pairs being located at two sides of the ball screw pair, respectively, and wherein each one of the sliding table guide rail pairs includes a guide rail bar (4), fixed on the upper surface of the sliding seat (1), and two sliders (5) embedded in the guide rail bar, and wherein the ball screw pair includes a ball screw (2) and a nut (3) inserted on the ball screw (2);

a nut seat (6) disposed on the nut (3); and nut seat guide rail pairs, a micro-moving table (8) and a piezoelectric actuator (7) disposed on the nut seat (6), wherein one end of the piezoelectric actuator (7) is fixedly connected with the nut seat (6), the other end thereof is fixedly connected with the micro-moving table (8), the upper surfaces of the slider (5) and the micro-moving table (8) are fixed on the lower surface of the sliding table (11); and wherein the nut seat (6) comprises a nut seat body (6-3), side wings (6-1) and a protrusion (6-2) disposed on a front portion of the upper surface of the nut seat body (6-3); the side wings (6-1) are disposed at two sides of the nut seat body (6-2), respectively; the nut seat body (6-3) is provided with a hole, and the nut (3) is fixedly mounted in the hole of the nut seat body (6-3); the micro-moving table (8) is disposed on a back portion of the upper surface of the nut seat body (6-3), one end of the piezoelectric actuator (7) is fixedly connected to the protrusion (6-2), and the other end thereof is fixedly connected to the micro-moving table (8); and sliders (12) are fixed on the lower surfaces of the two side wings, and the sliders (12) as nut seat guide rail pairs are embedded in the guide rail bars (4).

5. The device of claim 4, being characterized in that, the side wings (6-1) at two sides of the nut seat (6) extend into notches in two sides of the sliding table (11), respectively; and a gap is kept between the side wing (6-1) and the sliding table (11).

6. The device of claim 5, being characterized in that, an axis of the ball screw (2) coincides with the symmetric line of the two sliding table guide rail pairs; and the axis of the piezoelectric actuator (7) coincides with the symmetric line of the two sliding table guide rail pairs.

\* \* \* \* \*